United States Patent
Calinescu

(10) Patent No.: US 7,597,647 B2
(45) Date of Patent: Oct. 6, 2009

(54) DEVICE FOR DISPLACING A SEAT COMPONENT

(75) Inventor: Eugen Calinescu, Nuremberg (DE)

(73) Assignee: Schukra Europa GmbH, Nuremberg (DE)

( * ) Notice: Subject to any disclaimer, the term of this patent is extended or adjusted under 35 U.S.C. 154(b) by 122 days.

(21) Appl. No.: 10/494,839

(22) PCT Filed: Oct. 25, 2002
(Under 37 CFR 1.47)

(86) PCT No.: PCT/EP02/11975

§ 371 (c)(1),
(2), (4) Date: Dec. 17, 2004

(87) PCT Pub. No.: WO03/039299

PCT Pub. Date: May 15, 2003

(65) Prior Publication Data

US 2006/0038433 A1     Feb. 23, 2006

(30) Foreign Application Priority Data

Nov. 5, 2001  (DE) ................................. 101 54 186

(51) Int. Cl.
*A47C 3/00* (2006.01)
*A47C 7/46* (2006.01)
*F16H 57/08* (2006.01)

(52) U.S. Cl. .................... 475/331; 475/344; 297/284.4; 297/284.7

(58) Field of Classification Search ................. 475/149, 475/150, 131, 331; 297/284.4, 284.7
See application file for complete search history.

(56) References Cited

U.S. PATENT DOCUMENTS 3,265,362 A * 8/1966 Moody ........................ 254/343
3,557,633 A * 1/1971 Frerichs ........................ 74/447

(Continued)

FOREIGN PATENT DOCUMENTS

EP         0696251 B        2/1996

(Continued)

OTHER PUBLICATIONS

International Search Report.

*Primary Examiner*—Tisha D Lewis
(74) *Attorney, Agent, or Firm*—Grant D. Kang; Kang Intellectual Property Law, LLC

(57) ABSTRACT

To adjust a component (17) of a seat (14), and particularly a seat (14) in a motor vehicle, use is made of an adjusting device (28, 29) which has a rotary drive (8) and a gearbox. The gearbox comprises a planetary gear train having a sunwheel (7) driven by the rotary drive (8), at least one planetary gear (4) mounted to rotate on a planetary gear carrier (6) and a fixed annular gear (1). The at least one planetary gear (4) meshes with the sunwheel (7) and the annular gear (1). The output of the gearbox is taken from the planetary gear carrier (6), which takes the particular form of a cable drum so that the adjustment of the component of the seat can be performed by means of a traction cable secured to the cable drum which can be wound up thereon. With the help of a gearbox of this form it is possible to achieve a particularly small size, which substantially simplifies the fitting of the adjusting device (28, 29) into a seat (14).

19 Claims, 2 Drawing Sheets

U.S. PATENT DOCUMENTS

| | | | | |
|---|---|---|---|---|
| 3,600,977 A | * | 8/1971 | Bogie | 475/343 |
| 4,714,274 A | * | 12/1987 | Nagashima | 280/801.1 |
| 4,787,593 A | * | 11/1988 | Pipon et al. | 248/396 |
| 4,930,057 A | * | 5/1990 | Williams | 362/272 |
| 5,345,157 A | * | 9/1994 | Suzuki et al. | 318/280 |
| 5,397,164 A | * | 3/1995 | Schuster et al. | 297/284.1 |
| 5,911,477 A | | 6/1999 | Gowing et al. | |
| 6,050,641 A | | 4/2000 | Benson | |
| 6,158,300 A | * | 12/2000 | Klingler | 74/526 |
| 6,634,995 B1 | * | 10/2003 | Reed | 482/92 |
| 6,652,028 B2 | * | 11/2003 | McMillen | 297/284.4 |
| 6,676,214 B2 | * | 1/2004 | McMillen et al. | 297/284.1 |
| 6,883,867 B2 | * | 4/2005 | Klingler | 297/294.4 |
| 7,214,161 B2 | * | 5/2007 | Jinbo | 475/346 |

FOREIGN PATENT DOCUMENTS

| | | | |
|---|---|---|---|
| WO | WO 9965730 A | 12/1999 | |

* cited by examiner

DEVICE FOR DISPLACING A SEAT COMPONENT

This application claims priority to PCT/EP02/11975 filed on Oct. 25, 2002; which claims priority to German Patent DE10154186.4, filed on Nov. 5, 2001.

BACKGROUND OF THE INVENTION

The present invention relates to a device for adjusting a component of a seat or lounger, having a rotary drive and a gearbox able to be driven by the rotary drive which has an output for adjusting the component of the seat or lounger.

Seats and loungers are often fitted with various adjustment facilities to increase the comfort in which people can sit or lie on them. By using the adjustment facilities it is possible to adjust a seat or lounger to the varying needs of a person sitting or lying on it. These needs may depend on for example the physical characteristics of the person or the activity the person is performing. One possible adjustment of this kind is for example setting the angle between the seat proper of a seat and its backrest. In general terms, provision may be made for a seat or lounger to be divided into various segments and for it to be possible for the angle between two adjacent segments to be altered.

Adjustments of this kind may affect the external shape of a seat or longer. Provision may also be made for adjustments which affect the way in which it acts with a person sitting or lying on it. These include supports incorporated in the seat or lounger which support the person at certain points and which can be adjusted in respect of, for example, their position and shape.

To allow an adjustment to be made to a seat or lounger, suitable adjusting devices are needed which can be operated manually or by a motor.

In this way, there is known from EP-0 696 251 B1 a device for adjusting the height and/or curvature of a lumbar support having a gearbox driven by a drive, in which the drive drives a worm which engages in a worm wheel, which in turns drives a pinion which meshes with a gear driving a reel. Fastened to the reel is the inner traction cable of a Bowden cable arrangement which is used to adjust the lumbar support. The gear driving the reel has a land which co-operates with stops in the housing of the gearbox to limit the adjusting travel of the adjusting device. The particular disadvantage that this adjusting device has is that the parts which are needed in the gearbox take up a considerable amount of room and this has an adverse effect as far as fitting the gearbox into a seat or lounger is concerned. It has a particularly adverse effect as far as fitting an adjusting device of this kind into a seat for a motor vehicle is concerned, in which small dimensions are a requirement because of other components which are present and the small amount of space available.

SUMMARY OF THE INVENTION

The object of the present invention is to provide an adjusting device of the kind specified above which, though low in cost, requires only a small amount of space.

The adjusting device according to the invention has planetary gearing of which the sunwheel is driven by the rotary drive by means of worm gearing. The sunwheel is centrally located within an annular gear, there being arranged between the sunwheel and the annular gear at least one planetary gear which meshes both with the sunwheel and with the annular gear. Each planetary gear is mounted to rotate on a planetary gear carrier which in turn is mounted to rotate concentrically with the sunwheel. In an arrangement like this, the wormwheel, the annular gear and the planetary gear carrier are arranged concentrically to one another, thus giving a size which is reduced in comparison with the prior art. This is possible because, in particular, the worm gear and the annular gear are the two gears of largest diameter in the gearbox. Because it is precisely the large gears which are concentrically arranged, the layout which is obtained is more compact.

If, in the adjusting device according to the invention, it is desired to limit the adjusting travel, this can advantageously be done by providing the annular gear with internal teeth for only part of its circumference. The rest of the circumference of the annular gear is so designed that the planetary gear can roll only on the part which has internal teeth. This can for example be done by having the non-internally-toothed part project sufficiently far in the direction of the sunwheel for the teeth of the planetary gear to abut against the non-internally-toothed part as soon as they reach it. In this way it is possible to limit the adjusting travel of the adjusting device at particularly low cost, with this method of limiting having the advantage that the abutting against a limiting means does not cause much unpleasant noise. Any desired number of planetary gears can be used in the planetary gearing, the maximum number of gears that is possible depending in particular on the transmission ratio of the planetary gearing, the force the planetary gearing has to transmit and any limit that is desired to the adjusting travel of the adjusting device. At the same time, the cost of producing the adjusting device rises with the number of planetary gears, though as the number of planetary gears rises a better load distribution is obtained within the planetary gearing. If part of the annular gear is produced without internal teeth in order to limit the adjusting travel of the adjusting device, the maximum possible range of rotation of the planetary gear carrier is the angular range between two adjacent planetary gears. It is therefore advantageous for the planetary gearing to have only one planetary gear, which means that when limits are applied a maximum range of rotation of almost 360° is possible and there is thus a great deal of freedom as to the limited range of rotation.

Advantageously, the sunwheel is driven by a wormwheel with which a worm driven by the rotary drive engages. The advantage this has is that a high reduction ratio is obtained from only a single stage of gearing and in particular that any feedback of force from the adjustable seat or lounger component to the rotary drive is obviated. In this way the rotary drive is able, when stationary, to hold the adjustable component in the position to which it has been adjusted at the time, even if the component exerts a force on the gearing.

The output from the gearing which is used is advantageously a drum to which a traction cable is connected and onto which it can be wound. By means of a traction cable of this kind, an adjusting movement can be routed from the rotary drive to another point with particularly little cost and complication. The traction cable is advantageously guided in a Bowden cable arrangement.

Particularly when a traction cable is used, a return spring can be fitted which exerts a force on the adjustable component in the opposite direction to the tractive action of the traction cable.

The adjusting device according to the invention is suitable with particular advantage for adjusting a lumbar support in the backrest of a seat or lounger. In this case the lumbar support can be adjustable both in respect of its position in the backrest and in respect of its shape. Advantageously the lumbar support is positioned centrally in the backrest and is adjustable heightwise, thus enabling allowance to be made for seated persons with backs of different lengths.

The adjustment of the shape of a lumbar support is advantageously effected with the help of a curving member whose curvature is adjustable. A curving member of this kind may in particular have at least one strip which is resilient in bending and of which two spaced sections are drawn towards one another so that the strip arches. By this simple drawing together of the strip at two different points it is thus possible to obtain a settable curvature for the lumbar support at only low cost and complication.

BRIEF DESCRIPTION OF THE DRAWING

The invention is explained in detail below by reference to a preferred embodiment and to the accompanying drawings.

DETAILED DESCRIPTION OF THE INVENTION

Figure 1:
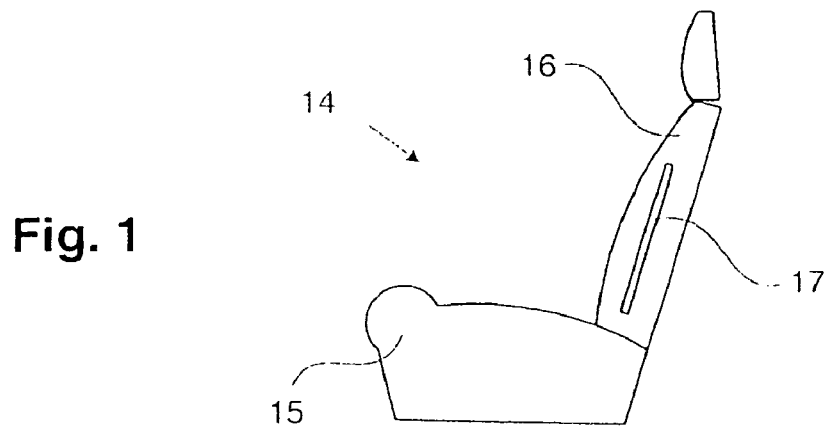
FIG. 1 is a diagrammatic sectional view from the side of a seat for use in a motor vehicle.

The seat 14 shown diagrammatically in FIG. 1 is intended for use in a motor vehicle and has a seat section 15 and a rest 16 connected thereto to hinge. Arranged in the rest 16 below padding is a lumbar support 17 by which additional support can be provided at a certain point for the spinal column of a person sitting on the seat 14.

To enable the lumbar support 17 to be matched to the particular requirements of a person sitting on the seat 14, the lumbar support 17 can be adjusted in respect of its heightwise position in the rest 16. For this purpose the lumbar support 17 is guided to be longitudinally displaceable within the rest 16 at the centre of the latter. It is also possible for the pressure from the lumbar support 17 which acts in the forward direction to be set in order to vary its supporting action.

Figure 2:
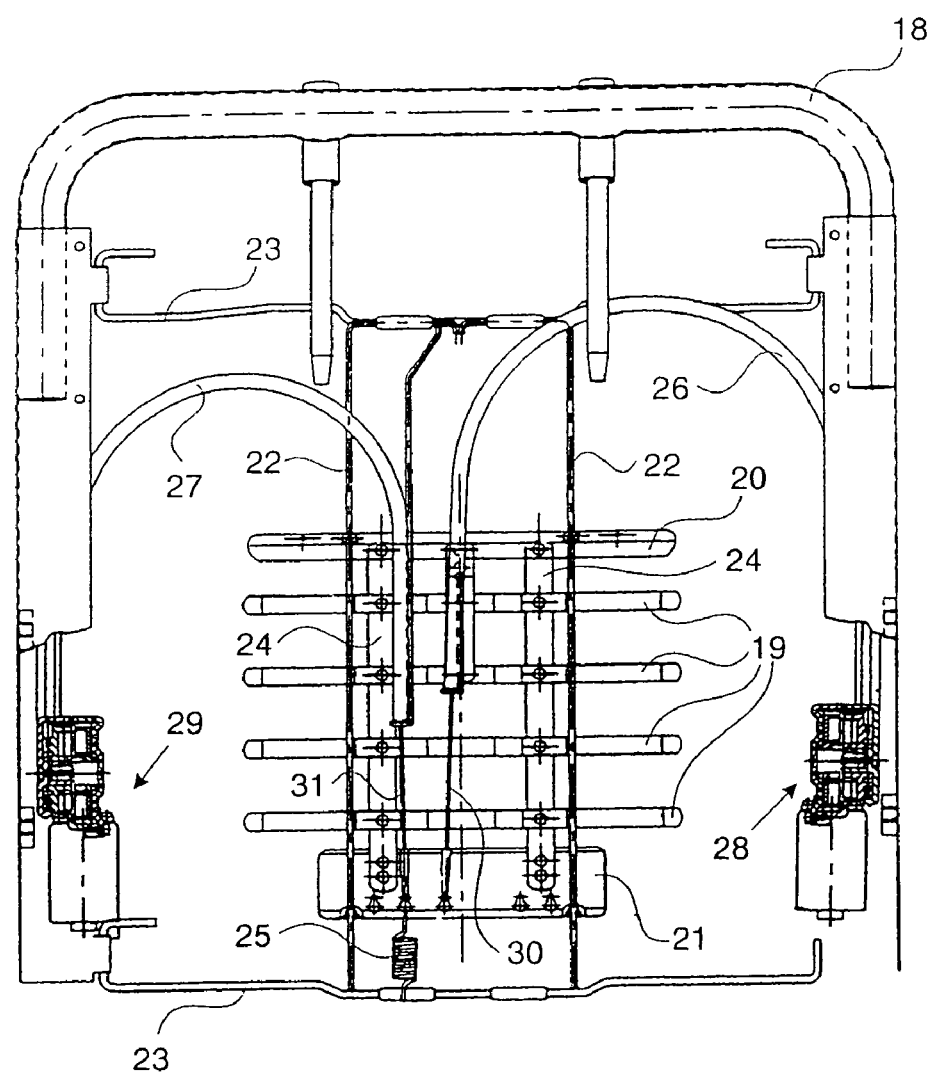
FIG. 2 shows a lumbar support arranged in the seat shown in FIG. 1.

The lumbar support 17 which is shown from the front in FIG. 2 has a frame 18 for fastening into the rest 16, to which the other parts of the lumbar support 17 are attached. Between the two longitudinals of frame 18 two resiliently bendable longitudinal strips 24 are arranged which are connected together by spaced transverse strips 19. Fastened to the top end of the longitudinal strips 24 is a top terminating strip 20 and to the bottom end of the longitudinal strips 24 a reinforcing plate 21 is fastened. Top terminating strip 20 and reinforcing plate 21 are mounted to be longitudinally displaceable on two longitudinal rods 22 which extend parallel to longitudinal strips 24. Longitudinal rods 22 are connected to frame 18 at their top and bottom ends by transverse rods 23.

The bottom transverse rod 23 is connected to reinforcing plate 21 by a coil spring 25. As a result, reinforcing plate 21, together with longitudinal strips 24, transverse strips 19 and top terminating strip 20, can be moved upwards along longitudinal rods 22 by upwardly directed traction.

Longitudinal strips 24 and the mounting for them on longitudinal rods 22 by means of top terminating strip 20 and reinforcing plate 21 are so designed that if top terminating strip 20 and bottom reinforcing plate 21 are pressed towards one another, longitudinal strips 24 will arch forwards against the back of a person sitting on seat 14.

Fastened to the bottoms of respective longitudinals of frame 18 are a curvature adjusting means 28 and a heightwise adjusting means 29. Curvature adjusting means 28 is connected in this case via a Bowden cable 26 to top terminating strip 20 and reinforcing plate 21. Inside of it the Bowden cable 26 has a traction cable 30 which is connected to reinforcing plate 21. The casing of Bowden cable 26 on the other hand is supported against top terminating strip 20. If curvature adjusting means 28 then pulls traction cable 30 through the casing of Bowden cable 26 and towards itself, top terminating strip 20 and reinforcing plate 21 are drawn towards each other, whereupon the curvature of longitudinal strips 24 becomes more pronounced. If curvature adjusting means 28 slackens off, traction cable 30 is pulled back by the resilient force exerted by the two longitudinal strips 24.

Heightwise adjusting means 29 acts via a Bowden cable 27 which has a casing with a traction cable 31 inside it. The casing of Bowden cable 27 is supported from the top transverse bar 23 and traction cable 31 of the heightwise adjusting means is connected to reinforcing plate 21. If heightwise adjusting means 29 then draws traction cable 31 towards itself, reinforcing plate 21 is drawn upwards in opposition to the force exerted by coil spring 25. If heightwise adjusting means 29 relaxes traction cable 31, reinforcing plate 21 is pulled downwards by coil spring 25. Since top terminating strip 20 is mounted to move by sliding on the two longitudinal rods 22, the two curved longitudinal strips 24 can be moved up or down together with the cross-members 19 fastened to them.

Figure 4:
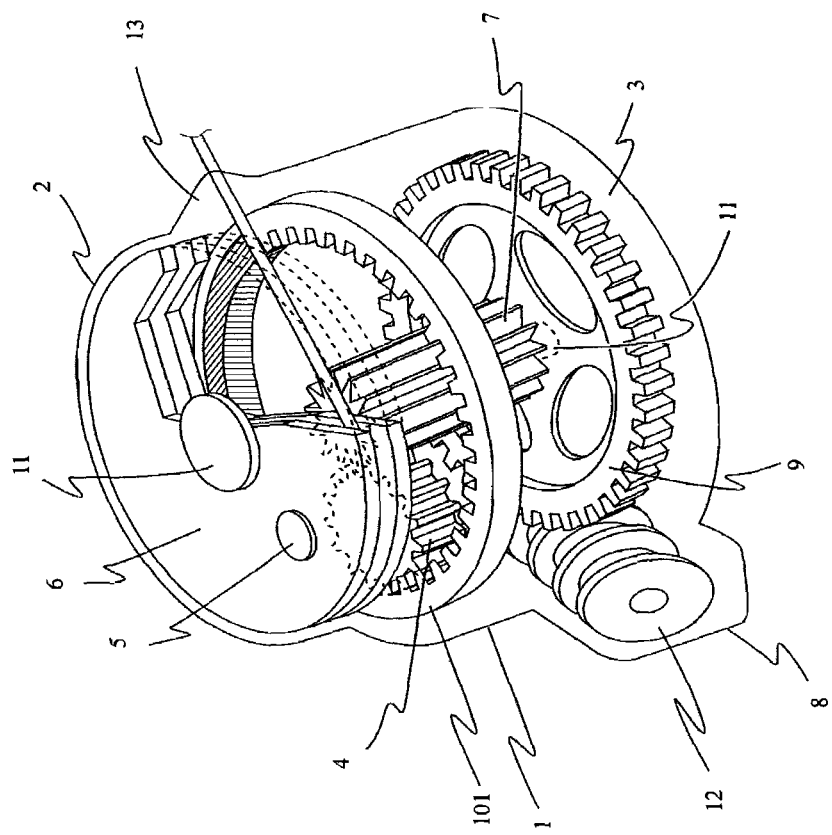
FIG. 4 is a perspectice view of the adjusting device shown in FIG. 3.
Figure 3:
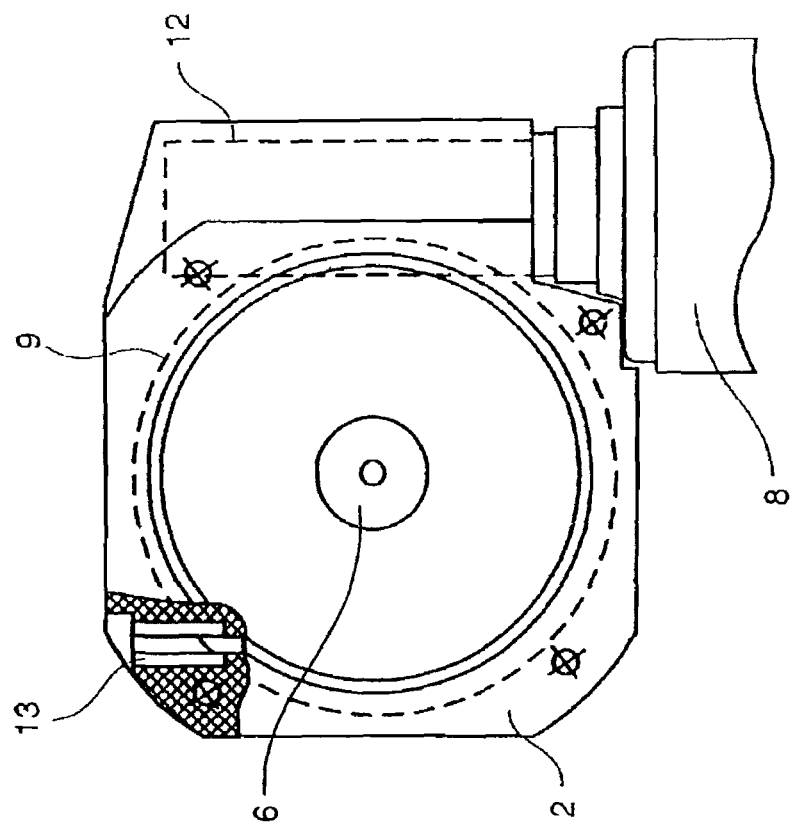
FIG. 3 is a partial plan view of an adjusting device used for adjusting the lumbar support shown in FIG. 2.

Curvature adjusting means 28 and heightwise adjusting means 29 are both constructed in the same way and they are shown diagrammatically in FIGS. 3 and 4. The two adjusting devices 28, 29 each have a motor 8 to act as their rotary drive and, fastened thereto, a gearbox which acts on traction cable 30 or 31 as the case may be. FIG. 3 is a partial plan view of the gearbox and motor. FIG. 4 is a perspective view of the gearbox.

The gearbox which is shown in perspective in FIG. 4 has a housing 1 which is connected to motor 8. A top cover 2 and a bottom cover 3 can be fastened to the two sides of housing 1. The two covers 2, 3 have opposing concentric seatings which are used to support the gears arranged in housing 1. Arranged inside housing 1 is a wormwheel 9 which is provided with external teeth and which encloses within it and in such a way as to be secured to it in rotation a sunwheel 7 which projects beyond wormwheel 9. Arranged concentrically with the sunwheel 7 is a cable pulley 6 which carries a groove around its circumference. Formed on the cable pulley 6 is a hub by means of which the cable pulley is mounted in an opening in top cover 2. Cable pulley 6 also has, in the centre, a bore in which is mounted a shaft 11 on which sunwheel 7 is mounted and whose end opposite from cable pulley 6 is mounted in bottom cover 3 by means of a bushing.

Mounted to rotate on cable pulley 6 via a pin 5 is a planetary gear 4 which is located between cable pulley 6 and wormwheel 9. Planetary gear 4 meshes with sunwheel 7. Formed in housing 1 in the plane of planetary gear 4 is an annular gear 101 having internal teeth, with which planetary gear 4 also meshes. Together with the annular gear 101 formed in housing 1, planetary gear 4 and the cable pulley 6 which acts as a planetary gear carrier, sunwheel 7 forms a planetary gear train whose input is sunwheel 7 and whose output is cable pulley 6.

In the plan view of the gearbox shown in FIG. 3, wormwheel 9 and a worm 12 which engages with wormwheel 9 are indicated in broken lines. The worm 12 is connected to the shaft of motor 8 to be secure in rotation therewith and drives wormwheel 9. In the plan view shown in FIG. 3, part of top cover 2 has been removed. In the area thus revealed a leadthrough 13 can be seen which is situated in the plane of the groove in cable pulley 6 and which is aligned tangentially to said groove. Leadthrough 13 serves to lead traction cable 30 or 31 through, which can be fastened to cable pulley 6 and can be wound up in its groove. On the outside leadthrough 13 ends in an abutment for the casing of Bowden cable 26 or 27.

When curvature adjusting means 28 or heightwise adjusting means 29 is actuated, motor 8 drives the worm in the direction of rotation which turns wormwheel 9 and the sunwheel 7 fastened thereto. The rotation of sunwheel 7 causes planetary gear 4 to roll in the annular gear 101 formed in housing 1, thus causing cable pulley 6 to be turned as well by means of pin 5. Cable pulley 6 in turn pulls on traction cable 30 or 31 and in this way produces the adjustment.

In the stationary state it is true that a tensile force acts on cable pulley 6 via traction cable 30 or 31 but due to the self-locking action of worm gearing 9, 12 this force does not result in the shaft of motor 8 being turned. Hence no additional locking devices are required to hold the two adjusting devices 28, 29 in the position they are in at the time when the motor 8 is not excited.

The two adjusting devices 28, 29 are each fitted with limiting means to give a defined range of adjustment. The purpose of these limiting means is to prevent damage to lumbar support 17 and to produce defined adjusted positions. To limit the range of adjustment, the annular gear 101 formed in housing 1 may have internal teeth around only part of its circumference. The remaining part of its circumference on the other hand projects sufficiently far towards sunwheel 7 to make it impossible for planetary gear 4 to roll into this region. As soon as planetary gear 4 reaches an end of this region, at least one of its teeth abuts against the region and stops cable pulley 6 from moving any farther. Because of the external teeth on planetary gear 4 which roll on the internal teeth in the annular gear 101 in housing 1, only a very small amount of noise is produced at the abutment against the non-toothed part of the annular gear 101, which is an advantage. The design according to the invention of the gearbox in the adjusting devices 28, 29 allows a very small amount of noise to be produced, particularly when the abutments are reached, and this is advantageous in making adjusting devices 28, 29 pleasant to operate.

The invention claimed is:

1. An adjustment device adjustably connected to a seat component comprising:
    a rotary drive; and
    a gearbox in a driven relationship with the rotary drive, wherein the gearbox comprises a housing, a sunwheel, an annular gear, a planetary gear and a planetary gear carrier, wherein the sunwheel is driven by the rotary drive; the planetary gear carrier rotates concentrically with the sunwheel; and the planetary gear consists essentially of a single set of teeth having a single radius, the single set of teeth of the planetary gear meshing with a set of teeth of the sunwheel and a set of teeth of the annular gear; and
    a bowden cable having a casing and a traction cable slidable through inside of said casing, said traction cable being in operative communication with the planetary gear carrier, wherein the traction cable actuates the seat component;
    wherein said housing has a through-hole for leading said traction cable therethrough, and wherein an end of said casing of said bowden cable abuts on a periphery of said through-hole; and
    wherein said annular gear comprises an internally toothed portion and a non-internally-toothed portion, wherein the set of teeth of said annular gear are formed within said internally toothed portion, and wherein a portion of an end region of said non-internally-toothed portion of said annular gear comprises a damping abutment.

2. The adjustment device according to claim 1, wherein the planetary gear carrier comprises a cable pulley.

3. The adjustment device according to claim 1, wherein the gearbox provides a limited range of adjustment.

4. The adjustment device according to claim 1, wherein the planetary gear rolls on the internally toothed portion of the annular gear and does not roll on the non-internally-toothed portion of the annular gear.

5. The adjustment device according to claim 1, comprising a plurality of planetary gears.

6. The adjustment device according to claim 1, further comprising a wormwheel connected to the sunwheel, wherein the sunwheel is in rotation with the wormwheel.

7. The adjustment device according to claim 6, further comprising a worm connected to the rotary drive, wherein the wormwheel engages with the worm.

8. The adjustment device according to claim 7, wherein the rotary drive comprises a shaft in solid rotation with the worm.

9. The adjustment device according to claim 2 wherein the traction cable is fastened to the cable pulley.

10. The adjustment device according to claim 1, wherein the annular gear is formed in a housing of the gearbox.

11. The adjustment device according to claim 1, further comprising a return spring exerting pretensioning in a direction of a range of adjustment of the gearbox.

12. The adjustment device according to claim 1, wherein the seat component comprises a lumbar support, and the lumbar support is adjustable with respect to at least one of its position and shape.

13. The adjustment device according to claim 12, wherein the lumbar support further comprises an adjustable curving element.

14. A gearbox operatively connected to a drive unit and adjustably connected to a seat component, comprising:
    a housing;
    a sunwheel in a driven relationship with the drive unit;
    an annular gear;
    a planetary gear, wherein the planetary gear has a single set of teeth having a single radius, the single set of teeth of the planetary gear meshing with a set of teeth of the sunwheel and a set of teeth of the annular gear;
    a planetary gear carrier, wherein the planetary gear carrier rotates concentrically with the sunwheel; and
    a bowden cable having a casing and a traction cable slidable through inside of said casing, said traction cable being in operative communication with the planetary gear carrier, wherein the traction cable actuates the seat component;
    wherein said housing has a through-hole for leading said traction cable therethrough, and wherein an end of said casing of said bowden cable abuts on a periphery of said through-hole; and
    wherein said annular gear comprises an internally toothed portion and a non-internally-toothed portion, wherein the set of teeth of said annular gear are formed within said internally toothed portion, and wherein a portion of an end region of said non-internally-toothed portion of said annular gear comprises a damping abutment.

15. The gearbox according to claim 14, wherein the planetary gear rolls on the internally toothed portion of the annular gear and does not roll on the non-internally-toothed portion of the annular gear.

16. The gearbox according to claim 14, further comprising a housing.

17. The gearbox according to claim 16, wherein the annular gear is formed in the housing.

18. The gearbox according to claim 14, further comprising a return spring exerting a pretension in a direction of a range of adjustment of the gearbox.

19. The gearbox according to claim 14, wherein the seat component comprises an ergonomic device.

* * * * *